US006290841B1

(12) United States Patent
Gabrielov et al.

(10) Patent No.: US 6,290,841 B1
(45) Date of Patent: Sep. 18, 2001

(54) HYDROTREATING PROCESS USING SULFUR ACTIVATED NON-CALCINED CATALYST

(75) Inventors: Alexei Grigorievich Gabrielov, Houston; Opinder Kishan Bhan, Katy, both of TX (US)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 09/599,097

(22) Filed: Jun. 22, 2000

Related U.S. Application Data

(62) Division of application No. 09/250,208, filed on Feb. 15, 1999, now Pat. No. 6,218,333.

(51) Int. Cl.[7] .................................................. C10G 25/00
(52) U.S. Cl. .......................... 208/213; 208/215; 208/213
(58) Field of Search ............................... 208/216 R, 251, 208/254, 215, 213

(56) References Cited

U.S. PATENT DOCUMENTS

| 3,509,044 | 4/1970 | Adams et al. | 208/216 |
|---|---|---|---|
| 3,686,137 | 8/1972 | Gatti | 252/437 |
| 3,761,397 | 9/1973 | Gatti | 208/143 |
| 3,770,617 | 11/1973 | Riley et al. | 208/216 |
| 4,530,917 | 7/1985 | Berrebi | 502/220 |
| 4,548,920 | 10/1985 | Thompson et al. | 502/219 |
| 4,574,120 | 3/1986 | Thompson | 502/220 |
| 4,636,487 | 1/1987 | Parrott et al. | 502/168 |
| 4,960,506 | 10/1990 | Halbert et al. | 208/215 |
| 4,981,828 | 1/1991 | Takahashi et al. | 502/168 |
| 4,992,403 | 2/1991 | Takahashi et al. | 502/164 |
| 5,045,518 | 9/1991 | Heinerman et al. | 502/216 |
| 5,139,990 | 8/1992 | de Jong et al. | 502/216 |
| 5,164,354 | 11/1992 | Aldridge et al. | 502/220 |
| 5,198,100 | 3/1993 | Aldridge et al. | 208/89 |
| 5,334,307 | 8/1994 | Simpson et al. | 208/254 H |
| 5,336,654 | 8/1994 | Aldridge et al. | 502/170 |
| 5,338,717 | 8/1994 | Aldridge et al. | 502/211 |
| 5,468,372 | 11/1995 | Seamans et al. | 208/216 |
| 5,525,211 | 6/1996 | Sudhakar et al. | 208/217 |
| 5,688,736 | 11/1997 | Seamans et al. | 502/219 |
| 5,770,046 | 6/1998 | Sudhakar | 208/216 R |
| 5,851,382 | * 12/1998 | Sudhakar | 208/216 R |
| 5,922,638 | 7/1999 | Dufresne et al. | 502/216 |

FOREIGN PATENT DOCUMENTS

| 181035 | 5/1986 | (EP) . |
|---|---|---|
| 9641848 | 12/1996 | (WO) . |

OTHER PUBLICATIONS

Maitra, et al., "Novel Hydrotreating Catalysts Prepared from Heteropolyanion Complexes Impregnated on Alumina", *Applied Catalyst,* 48 (1989), pp. 187–197.

* cited by examiner

*Primary Examiner*—Helane E. Myers

(57) ABSTRACT

A hydrotreating process using a catalyst prepared by a process wherein the volatile content of a metal-impregnated support is reduced in the presence of a sulfur containing compound without reaching calcining temperatures.

10 Claims, 2 Drawing Sheets

FIGURE 1. WABT REQUIRED FOR 88% SULFUR REMOVAL
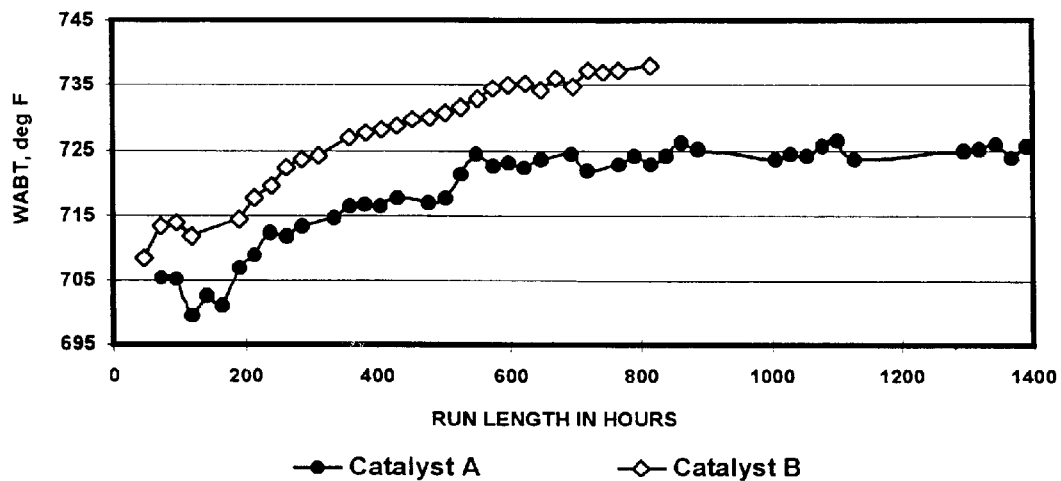
FIGURE 2. WABT REQUIRED FOR 88% SULFUR REMOVAL
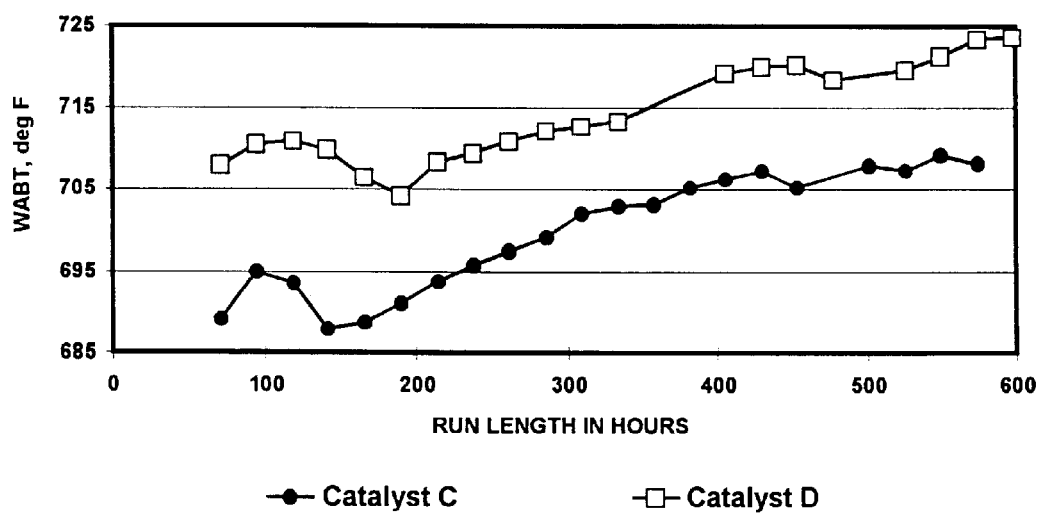

FIGURE 3. WABT REQUIRED FOR 30% TOTAL NITROGEN REMOVAL
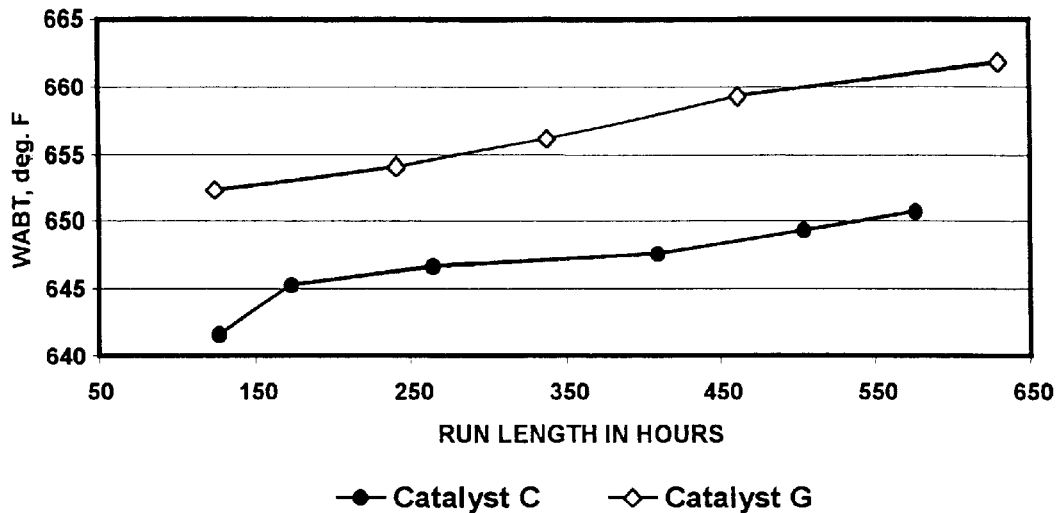
FIGURE 4. WABT REQUIRED FOR 30% BASIC NITROGEN REMOVAL
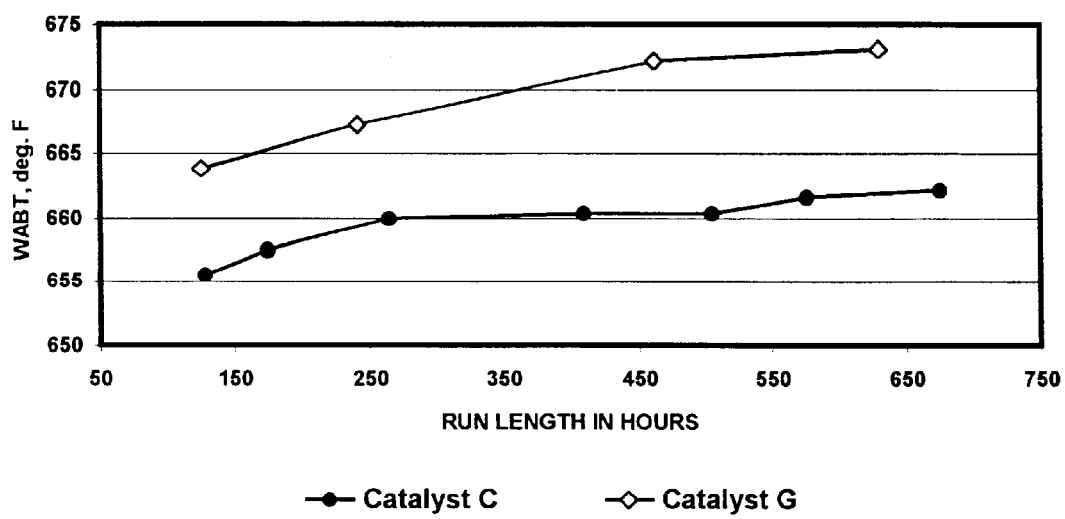

HYDROTREATING PROCESS USING SULFUR ACTIVATED NON-CALCINED CATALYST

This application is a divisional application of application serial number 09/250,208, filed Feb. 15, 1999,. Now U.S. Pat. No. 6,218,333.

FIELD OF THE INVENTION

This invention relates to catalytic hydrotreatment of hydrocarbonaceous feedstocks.

BACKGROUND OF THE INVENTION

Petroleum feedstocks are characterized by relatively high levels of contaminants, including sulfur, nitrogen, Conradson carbon residue, aromatic compounds and metals such as nickel, vanadium and iron. During catalytic hydroprocessing heterogeneous catalysts are contacted with a feedstock in the presence of hydrogen under conditions of elevated temperature and pressure to reduce the concentration of the contaminants in feedstocks. The hydrotreating process promotes reactions such as hydrodesulfurization (HDS), hydrodenitrogenation (HDN), Conradson carbon removal, hydrodemetallation (HDM) and aromatics saturation, accompanied by a boiling shift to lower boiling products. As the sulfur and nitrogen components are converted into hydrogen sulfide and ammonia, metals are deposited onto the catalyst. The results include producing ecologically clean hydrocarbon products such as fuels and protecting other downstream refining catalysts from deactivation.

Processes for removing heteroatoms from feedstocks are known in the art as are catalysts for such removal. Typically, hydroprocessing catalysts contain Group VI and/or Group VIII active metal components supported on a porous refractory oxide such as alumina, alumina-silica, silica, zeolites, titania, zirconia, boria, magnesia and their combinations. Such catalysts are often prepared by combining the active metals with the support. The supports, containing metal components, are typically dried and calcined at the temperatures ranging from about 370° C. to 600° C. to eliminate any solvent and to convert metals to the oxide form. The calcined metal oxide catalysts are then typically activated by contacting with a sulfur containing compound such as hydrogen sulfide, organic sulfur compounds or elemental sulfur to convert metal oxides into catalytically active metal sulfides.

An important and continuing aim in the refining catalyst art is to develop new high performance hydroprocessing catalysts in order to obtain high quality oil products and improve refinery economics. Variations in compositional characteristics or methods of preparation of hydroprocessing catalysts have been attempted to reach these objectives.

It is known in the art that uncalcined catalysts usually provide higher dispersion of active components thereby improving hydrotreating activities. It is essential for the uncalcined catalysts that the active components, such as Group VI and/or Group VIII metal compounds, and promoters such as phosphorous, are not converted into oxide form during a high temperature step. That is, the active compounds are maintained without chemical decomposition until sulfurizing. For example, U.S. Pat. Nos. 5,198,100, 5,336,654 and 5,338,717 disclose a method for preparing a hydrotreating catalyst by impregnating a refractory support with a salt of Group VI metals and with the Group VIII metal heteropolyacids. The catalyst is not calcined or subjected to high temperatures, thereby retaining the heteropolyacids in the original form on the support; however, complete moisture removal from the catalyst during a high vacuum drying step is required before the catalyst is sulfurized.

In general, as the activity of an uncalcined catalyst is increased, the hydrotreating conditions required to produce a given oil product become more mild. Milder conditions require less capital investment to achieve the desired product specifications, such as allowed levels of sulfur, nitrogen, Conradson carbon residue, metals and aromatics, and the catalyst's life is extended due to lower coke formation and other factors.

It has been surprisingly been found that preparation of an uncalcined catalyst using a combined volatile content reduction-sulfurizing step allows for the catalyst to be prepared at lower temperatures, in less steps and without calcination, resulting in a catalyst with excellent hydrotreating activity and stability.

SUMMARY OF THE INVENTION

The process of the invention allows one to prepare a catalyst while using a combined volatile content reduction-sulfurizing step. The process comprises:

providing a porous support;

combining said support with one or more catalytically active metals, thereby forming a catalyst precursor having a volatile content; and reducing the volatile content of the catalyst precursor in one or more steps, wherein at least one volatile content reduction step is performed in the presence of at least one sulfur containing compound;

wherein the catalyst precursor does not reach calcining temperatures prior to said at least one combined volatile content reduction-sulfurizing step.

There is also provided a process for preparing a catalyst suitable for hydrotreatment of a hydrocarbonaceous feedstock, said process comprising:

combining a porous support with one or more catalytically reactive metals selected from Group VI and Group VIII of the Periodic Table, thereby forming a catalyst precursor having a volatile content; and reducing the volatile content of the catalyst precursor in one or more steps, wherein at least one volatile content reduction step is performed in the presence of at least one sulfur containing compound;

wherein the catalyst precursor does not reach calcining temperatures prior to said at least one combined volatile content reduction-sulfurizing step.

Further, there is provided a process for hydrotreating a hydrocarbonaceous feedstock, said process comprising contacting said feedstock at elevated temperature and elevated pressure in the presence of hydrogen with one or more catalyst beds; wherein at least one catalyst bed contains a catalyst prepared by the process comprising combining a porous support with one or more catalytically reactive metals selected from Group VI and Group VIII of the Periodic Table, thereby forming a catalyst precursor having a volatile content and reducing the volatile content of the catalyst precursor in one or more steps, wherein at least one volatile content reduction step is performed in the presence of one or more sulfur containing compounds; and wherein the catalyst precursor does not reach calcining temperatures prior to said at least one combined volatile content reduction-sulfurizing step.

There is further provided a catalyst made by the process comprising combining a porous support with one or more catalytically active metals, thereby forming a catalyst precursor having a volatile content; and reducing the volatile content of the catalyst precursor in one or more steps, wherein at least one volatile content reduction step is performed in the presence of at least one sulfur containing compounds; wherein said catalyst precursor does not reach calcining temperatures prior to said at least one combined volatile content reduction-sulfurizing step.

BRIEF DESCRIPTION OF THE DRAWINGS

FIG. 1. shows the weighted average bed temperature (WABT) required for 88% HDS activity of a catalyst made by the process of the invention versus a catalyst made by a conventional process.

FIG. 2. shows the WABT required for 88% HDS activity of a catalyst made by the process of the invention versus a commercial catalyst.

FIG. 3. shows the temperature required for 30% total nitrogen removal by a catalyst made by the process of the invention versus a commercial catalyst.

FIG. 4. shows the temperature required for 30% basic nitrogen removal by a catalyst made by the process of the invention versus a commercial catalyst.

DETAILED DESCRIPTION

In conventional preparation of sulfurized catalysts, an inorganic support is dried, calcine and combined with one or more catalytically active metals to form a catalyst precursor. The precursor is then optionally aged and moisture is driven from the pores of the precursor by drying. The catalyst precursor is then calcined at high temperature in direct contact with hot gas to remove residual moisture and to convert metal precursor into oxide form. "Calcination temperatures" as used herein shall mean the calcination temperatures of 400° C. to 600° C., which are typically used in the art. When calcination is completed, the precursor is sulfurized to form a catalyst.

Under the process of the present invention, a catalyst is prepared by combination of a porous carrier with one or more catalytically active metals to form a catalyst precursor having a volatile content. The volatile content of the catalyst precursor is then reduced in one or more steps. Volatile content reduction may take place, for example, by treating the precursor in air at temperatures below calcination temperatures, or simply by dehydrating at ambient conditions. At least one of the volatile content reduction steps is conducted in the presence of one or more sulfur containing compounds and, prior to this volatile content reduction-sulfurizing step, the catalyst precursor is not allowed to reach calcination temperatures.

The combined volatile content reduction-sulfurizing step(s) may be conducted in-situ or ex-situ. After volatile content reduction and sulfurizing is completed, the catalyst may be activated further using a liquid phase activation at elevated temperatures. For example, is ex-situ pre-sulfurizing is employed, the catalyst may be contacted with a lighter feedstock to produce a supported metal sulfide catalyst. A variety of other sulfurizing techniques may be used to produce a sulfurized catalyst and reduce solvents from the catalyst pores at the same time. No conventional high temperature calcining of the catalyst or catalyst precursor is necessary.

The catalyst undergoes a weight loss during processing as volatile compounds such as solvents and/or organic and inorganic ligands (functional coordinating groups having one or more pairs of electrons to form coordination bonds with metals) are removed. As used herein, "volatile content" shall mean weight loss as calculated following exposure of a sample to air at 482° C. for two hours:

(sample weight before treatment)−(sample weight after treatment)/sample weight before treatment×100.

As used herein, "catalyst precursor" means a carrier which has been combined with one or more catalytically active metals which have not yet been activated.

"Sulfurizing", when used herein, means contacting the catalyst precursor with one or more sulfur containing compounds. A "sulfurized catalyst" is a catalyst in which active metal components are converted, at least in part, to metal sulfides.

In the process of this invention, the catalyst precursor, that is a carrier with deposited active metals, and optionally promoters, is not calcined. At least one volatile content reduction step is conducted in the presence of one or more sulfur containing compounds. The volatile content of the catalyst precursor is typically no less than about 0.5%, preferably from 2% to 25%, most preferably from 6 to 10% before the catalyst precursor is exposed to the combined volatile content reduction-sulfurizing step. No calcination of the catalyst precursor is necessary or performed and, in fact, allowing the catalyst precursor to reach calcination temperatures is detrimental to the results seen when the process of the invention is used. The combined volatile content reduction-sulfurizing step may be done in-situ (in the reactor where the catalyst will be used) or ex-situ. The hydrotreating performance of the resultant catalyst is greatly improved over catalyst made by the conventional method, and the process is simplified by eliminating the high temperature calcination step of conventional processes.

A porous support is typically used to carry the catalytically reactive metal(s). For hydrotreating catalysts, supports are typically alumina, alumina-silica, silica, titania, zirconia, boria, magnesia, zeolites and combinations thereof. Porous carbon-based materials such as activated carbon and/or porous graphite can be utilized as well. The preferred supports in this invention are alumina-based and alumina-silica-based carriers. Catalytically active metals typically chosen from Groups VI and VIII of the Periodic Table are deposited onto the support. Typically the metals are selected from molybdenum, tungsten, cobalt, nickel, and mixtures thereof. Promoters, such as phosphorous, may be used in combination with the catalytically active metals. Variations in catalyst preparation methods include impregnation, co-mulling and co-precipitation. The preferred method in this invention is impregnation, with the most preferred method being incipient wetness impregnation. The use of aqueous solutions is common; however, organic solvents such as aliphatic and aromatic hydrocarbons, alcohols, ketones, etc., can also be used to deposit soluble active components and promoters onto the carrier. Examples of aqueous solutions include those containing molybdates (such as di- and hepta-molybdates), molybdo- and tungsto-phosphates and silicates, polyoxometallates (such as heteropolyacids and transition metal complexes thereof), various metal chelate complexes, amine complexes, etc. The pH value of the aqueous solutions typically range from 1 to 12. The solution preparation techniques and methods for impregnation are well known in the art.

The catalyst precursor of the present invention may have some of its volatile content reduced in air at temperatures below calcination temperatures, including ambient conditions, or it may be moved directly to the sulfurizing step. Partial volatile content reduction to remove physically adsorbed solvents (remaining from an impregnation step) aids in transporting the catalyst should the volatile content reduction be conducted in-situ.

Without being tied to a particular theory, it is believed that the process of the invention controls the formation of bulky metal oxide phases in the catalyst pores by direct interaction of the catalytic metal with a sulfur containing compound below calcination temperatures, such that thermal agglomeration of the active component does not occur. As the precursor is sulfurized, sulfur compounds displace the solvent and the sulfur reacts with the metals to form highly dispersed metal sulfides before a substantial amount of bulky metal oxides can form. In the process of the invention the catalyst precursor, containing residual moisture, is exposed to a sulfur containing compound at temperatures that convert the metal precursors to catalytically active metal sulfides and drive the moisture out of the catalyst pores.

Typical in-situ sulfurization may utilize either gaseous hydrogen sulfide in the presence of hydrogen or liquid-phase sulfurizing agents such as organo sulfur compounds including alkylsulfides and polysulfides, thiols, sulfoxides, etc.

In ex-situ sulfurization, the catalyst is typically supplied to the user (refiner) in the "pre-sulfided" form where the metal oxides are converted at least in part to metal sulfides. Commercial ex-situ sulfurization processes include, for example, the ACTICAT® process (CRI International. Inc.), described in U.S. Pat. Nos. 5,468,372 and 5,688,736, and the SULFICAT® process (Eurecat US Inc.). In the practice of the present invention, ex-situ sulfurizing is preferred.

I the present invention the known ex-situ and in-situ processes described are modified by not calcining the catalyst at high temperatures prior to contacting the catalyst with sulfur compounds. At least one of the volatile content reduction steps is conducted in the presence of one or more sulfur containing compounds. Significantly higher activity and stability of the uncalcined catalyst are achieved as compared with catalyst made by conventional processes of separate drying, calcining and sulfurizing steps. It is believed that higher hydrotreating activity is achieved because of higher dispersion of active components since thermal agglomeration does not occur during catalyst preparation.

The catalyst made by the process of the invention may be used in a process for removing heteroatom and other contaminants from a hydrocarbonaceous feedstock accompanied by boiling point reduction. Such a process comprises contacting of catalyst with a feedstock at elevated temperature and elevated pressure in the presence of hydrogen with one or more catalyst beds. Temperatures are typically in the range from about 200° C. to about 470° C., total pressures are typically in the range of from about 50 psig to about 3500 psig, and liquid hourly space velocities (LHSV) typically range from 0.05 to 25 $h^{-1}$.

EXAMPLES

Catalyst Activity Testing

Hydrotreating activities of the catalysts of the following Examples were compared on a volumetric basis using trickle flow micro-reactors. The same catalyst volume, basis compacted bulk density, was used for each set of test conditions. The reactors were operated in an isothermal regime. To ensure appropriate irrigation and plug flow characteristics, the trilobe-shaped extrudated catalyst pellets were diluted with 80–60 mesh SiC in the volumetric catalyst-to-dilutant ratio of either 1:1 (Test Conditions 1–3) or 1:2.5 (Test Condition 4), and loaded into the reactor in four aliquots.

In-Situ Catalyst Sulfurization

A gas mixture of 5% $H_2S$ in hydrogen was used for catalyst sulfurizing. The sulfurizing pressure was maintained at about 50 psig (Test Conditions 1–3) and 150 psig (Test Condition 4). Temperature ramping during sulfurization was as follows: ambient to 204° C. at a rate of 1.5° C./min, holding for 2 hours, heating to 316° C. at a rate of 2° C./min, holding for 1 hour; heating to 371° C. at a rate of 3° C./min, holding for 2 hours; cooling to 204° C. and introducing a test feed.

In-Situ Catalyst Sulfurization

The ex-situ pre-sulfurizing was performed using the ACTICAT® process. A sample of catalyst was treated with a stoichiometric amount, based on the metal content of the catalyst, of powdered elemental sulfur plus 1.0 wt. % excess, based on the weight of the total catalyst, followed by heating the sulfur-incorporated catalyst in the presence of a liquid olefinic hydrocarbon. The pre-sulfurized catalyst precursors were activated in-situ using standard liquid phase activation.

Liquid Phase Catalyst Activation

The ex-situ pre-sulfurized catalyst precursors were placed into a trickle flow micro-reactor and activated with a diesel feed to convert the sulfur compounds on the pores into metal sulfides. Catalyst activation took place at a unit pressure of 900 psig, a hydrogen flow rate of 220 ml/min, and a diesel feed LHSV of 1.5 $h^{-1}$. The temperature was ramped to 135° C. and held for 1 hour; increased at a rate of 24° C./hour to 371° C. and held for 1 hour; and decreased to 204° C. and held for two hours followed by test feed introduction.

| Test Condition 1: | |
|---|---|
| Catalyst: | 100 cc stacked bed: |
| | Commercial HDM catalyst - 33.3% |
| | Experimental Catalyst - 66.7% |
| Pressure: | 1900 psig |
| LHSV: | 0.33 $hr^{-1}$ (total system) |
| WABT: | 385° C. |
| Gas Rate: | 4,000 scf $H_2$/bbl |
| Test Feed: | Straight run long (atmospheric) residue: |
| | Sulfur                   4.34 wt. % |
| | Nitrogen             0.26 wt. % |
| | Nickel                    18.5 ppm |
| | Vanadium          62.0 ppm |
| | Basic Nitrogen     667 ppm |
| | Microcarbon residue   11.4 wt. % |
| | Density at 15° C.      0.97 g/l |

| Test Condition 2: | |
|---|---|
| Catalyst: | 50 cc stacked bed: |
| Pressure: | 1000 psig |
| LHSV: | 1.5 $hr^{-1}$ |
| WABT: | 354° C. |
| Gas Rate: | 2,000 scf $H_2$/bbl |
| Test Feed: | Heavy vacuum gas oil: |
| | Sulfur                   1.07 wt. % |
| | Nitrogen             0.29 wt. % |
| | Nickel                    0.8 ppm |
| | Vanadium           0.6 ppm |
| | Basic Nitrogen     930 ppm |
| | Microcarbon residue    0.3 wt. % |
| | Density at 15° C.      0.92 g/l |

| Test Condition 3: | |
|---|---|
| Catalyst: | 25 cc stacked bed: |
| Pressure: | 2100 psig |

-continued

Test Condition 3:

| | |
|---|---|
| LHSV: | 0.3 hr$^{-1}$ |
| WABT: | 385° C. |
| Gas Rate: | 2,000 scf H$_2$/bbl |
| Test Feed: | Demetallized vacuum residue: |

| | | |
|---|---|---|
| | Sulfur | 2.1 wt. % |
| | Nitrogen | 0.39 wt. % |
| | Nickel | 19.0 ppm |
| | Vanadium | 33.0 ppm |
| | Basic Nitrogen | 1354 ppm |
| | Microcarbon residue | 12.0 wt. % |
| | Density at 15° C. | 0.98 g/l |

Test Condition 4:

| | |
|---|---|
| Catalyst: | 20 cc stacked bed: |
| Pressure: | 1650 psig |
| LHSV: | 2.2 hr$^{-1}$ |
| WABT: | 343° C. and 363° C. |
| Gas Rate: | 3,500 scf H$_2$/bbl |
| Test Feed: | Straight run gas oil: |

| | | |
|---|---|---|
| | Sulfur | 1.80 wt. % |
| | Nitrogen | 0.0448 wt. % |
| | Density at 15° C. | 0.86 g/l |

Example 1

An alumina extrudate (1.2 mm trilobe) was dried in air at 482° C. for two hours. The extrudate had the following physical properties:

| | |
|---|---|
| Compacted bulk density | 0.475 g/cc |
| Water pore volume | 0.94 cc/g |
| B. E. T. surface area | 296 m$^2$/g |

An impregnation solution was made by dissolving 39.1 g of phosphomolybdic acid (75%, obtained from ACROS) and 9.72 g NiCO$_3$ in 100 g de-ionized water at 60° C. After complete dissolution, 7.02 g of 85% H$_3$PO$_4$ were added. The volume of the solution was adjusted to a value equal to the water pore volume of the support. 200 grams of the support were impregnated with the solution and aged for 2 hours. The amount of metals loaded (dry basis) was 8 wt. % Mo, 2 wt. % Ni and 1 wt. % P.

To remove excess moisture, the catalyst precursor was air-treated below 85° C. for 1 hour and the volatile content was reduced to 6%, whereafter the precursor was recovered still containing residual moisture. The precursor was further dehydrated simultaneously with sulfurizing during an ACTI-CAT® process. No calcination steps were employed. The resultant catalyst is denoted as Catalyst A.

Catalyst A was placed into a micro-reactor and activated with a diesel feed, followed by testing according to Test Condition 1. The HDS activity of Catalyst A, as weighted average bed temperature (WABT) required for 88% HDS, is shown in FIG. 1.

Example 2
Comparative

An alumina extrudate (1.2 mm trilobe) with the following properties was used to make Catalyst B:

| | |
|---|---|
| Compacted bulk density | 0.484 g/cc |
| Water pore volume | 0.95 cc/g |
| B. E. T. surface area | 308 m$^2$/g |

Catalyst B was prepared by pore volume impregnation of the support as described in Example 1 followed by air-drying at 121° C. for 4 hours and calcination in air flow at 482° C. for 2 hours. The catalyst was then sulfided in-situ via a conventional method using a 5% H$_2$S in hydrogen mixture as described below.

Catalyst B was tested under Test Condition 1. The HDS activity of Catalyst B, as WABT required for 88% HDS, is shown in FIG. 1.

Example 3

A commercial 1.3 trilobe extrudate carrier #1 was used to make Catalyst C.

The impregnation solution was prepared by stirring together 21.62 g NiO, 35.2 g MoO$_3$, 9.05 g 86.1% phosphoric acid and de-ionized water. The volume of the mixture was approximately 168 ml. The mixture was heated, with stirring, to 99° C. for about 3 hours until the impregnation solution components were dissolved. The mixture was then cooled to ambient temperature. The volume of solution was adjusted to the pore volume of 200 grams of the support, which was impregnated as described in Example 1. The metal contents loaded were 3.8 wt. % Ni, 13.6 wt. % Mo and 2.0 wt. % P (dry basis).

The catalyst precursor was dehydrated in air at 99° C. for four hours until the volatile content was 6%. The catalyst precursor was then treated with the ACTICAT® process without employing any calcination steps. The resultant catalyst is referred to as Catalyst C.

Catalyst C was tested in Test Condition 1 versus a commercial catalyst treated with the standard ACTICAT® process using separate calcination and pre-sulfurizing steps (Catalyst D). The HDS activities of Catalysts C and D, as WABT required for 88% HDS, are shown in FIG. 2.

Example 4

The properties of the alumina extrudate (1.2 mm trilobe) used to make Catalysts E and F was as follows:

| | |
|---|---|
| Compacted bulk density | 0.505 g/cc |
| Water pore volume | 0.87 cc/g |
| B. E. T. surface area | 277 m$^2$/g |

The impregnation solution was prepared by dissolving 5.25 g NiCO$_3$ and 16.67 g ammonium dimolybdate, (NH$_4$)$_2$Mo$_2$O$_7$.(56.45 wt. % Mo) in 60 ml of 14.8 NH$_3$ solution in water. The volume of the solution was adjusted to 87 cc, and 100 g of the support was impregnated as described in Example 1. The metal loading was 2.3 wt. % Ni and 8.0 wt. % Mo (dry basis). The catalyst precursor was dehydrated overnight in air at 127° C. to remove excessive moisture and ammonia, then cooled to ambient temperature and divided into two equal portions. The first portion was directly presulfurized using the ACTICAT® process without any calcination step to remove residual moisture and load sulfur into the catalyst, as described in Example 3. The resultant catalyst is denoted as Catalyst E. The second portion was conventionally calcined at 482° C. for 2 hours, and sulfurized in-situ using an H$_2$/H$_2$S gas mixture (Catalyst F).

Catalyst E was tested versus Catalyst F using Test Condition 1. The HDS relative vloumetric activity (derived from the second order reaction rate constants for the two catalysts) was 25% higher for Catalyst E compared to that for Catalyst F at 400 hours on stream.

Example 5

Catalyst C was tested using Test Condition 2 versus a commercial catalyst (Catalyst G) which used the same carrier as that for Catalyst C. The (pre-calcined) commercial catalyst wa sulfurized in-situ using an H$_2$/H$_2$S gas mixture. The comparison test results are presented on FIGS. 3 and 4.

Example 6

Catalyst C was tested versus a commercial reference catalyst (same as Catalyst D except the sulfurization of the pre-calcined catalyst was performed in-situ using an H$_2$/H$_2$S gas mixture). The commercial catalyst is denoted as Catalyst H.

HDS activities of the two catalysts were compared using Test Condition 3. The HDS relative volumetric activity (derived from the second order reaction rate constants for the two catalysts) was 25% higher for Catalyst C compared to that for Catalyst H at 400 hours on stream.

Example 7

A commercial 1.3 trilobe extrudate carrier was used to make Catalyst I. The impregnation solution was prepared using the procedure described in Example 6; however the metal contents (dry basis) were as follows: 13.0 wt. % Mo, 3.0 wt. % Ni, 3.2 wt. % P. The catalyst precursor was dehydrated in air at 99° C. for three hours until the volatile content was 8%. The catalyst precursor was then treated with the ACTICATI® process without any additional drying/calcination steps.

Catalyst I was tested using Test Condition 4 versus a commercial catalyst (Catalyst J) having the same carrier and percentage of metals as Catalyst I. The (pre-calcined) commercial catalyst was sulfurized in-situ using an H$_2$/H$_2$S gas mixture. The HDN relative volumetric activity (derived from the first order reaction rate constants for the two catalysts) was 20% higher for Catalyst I compared to that for Catalyst J at 200 hours on stream at 343° C. WABT, and 40% higher for the Catalyst I at 300 hours at 363° C.

Example 8
Comparative

A commercial catalyst treated with standard ACTICAT® process using separate calcination and pre-sulfurizing steps (Catalyst D) was compared with the same type of commercial catalyst sulfurized in-situ with H$_2$/H$_2$S gas mixture (Catalyst K), using Test Condition 1. Catalyst D and Catalyst K were statistically undistinguishable in HDS and HDN performance during the test run (1400 hours on stream), demonstrating that effects seen due to the process of the invention are not due to differences in presulfurizing process.

As shown in the Examples and seen in FIGS. 1–4, the HDS and HDN activities of the catalysts prepared by the process of the invention (Catalysts A, C, E and I) are significantly higher than that of the catalysts prepared by standard processes utilizing separate steps for drying, calcining and sulfurizing. Consequently, substantially lower sulfur and/or nitrogen content in the petroleum product is achievable by combining the dying/sulfurizing steps and eliminating the calcining step. A higher activity catalyst makes it possible to operate a commercial unit at less severe conditions while producing on-spec product. This in turn should increase the catalyst life and decrease operating costs.

It will be apparent to one of ordinary skill in the art that many changes and modifications may be made to the invention without departing from its spirit or scope as set forth herein.

We claim:

1. A process for catalytic hydrotreatment of a heteroatom-contaminated hydrocarbonaceous feedstock, said process comprising contacting said feedstock at elevated temperature and elevated pressure in the presence of hydrogen with one or more catalyst beds; wherein at least one catalyst bed contains a catalyst prepared by a process comprising combining a porous support with one or more catalytically active metals selected from Group VI and Group VIII of the Periodic Table, thereby forming a catalyst precursor having a volatile content, and then reducing the volatile content of the catalyst precursor in one or more steps, wherein at least one volatile content reduction step is performed in the presence of one or more sulfur containing compounds prior to said catalyst precursor reaching calcining temperatures.

2. The process of claim 1 wherein said at least one volatile content reduction step occurs during a liquid phase sulfurization process.

3. The process of claim 1 wherein said at least one volatile content reduction step is completed ex-situ.

4. The process of claim 1 wherein said at least one volatile content reduction step is completed in-situ.

5. The process of claim 1 wherein said catalyst precursor has a volatile content greater than 0.5 percent before performing said at least one volatile content reduction step in the presence of one or more sulfur containing compounds.

6. The process of claim 1 wherein said one or more catalytically active metal is selected from the group consisting of molybdenum, tungsten, cobalt, nickel, and oxides, sulfides and mixtures thereof.

7. The process of claim 1 wherein said porous support is selected from the group consisting of alumina, alumina-silica, silica, titania, zirconia, boria, magnesia, zeolites and combinations thereof.

8. The process of claim 1 wherein said process is carried out at a temperature between about 200° C. and about 700° C.

9. The process of claim 1 wherein said process is carried out at a total pressure between about 50 psig and about 3500 psig.

10. The process of claim 1 wherein said process is carried out at a liquid hourly space velocity between about 0.05 h$^{-1}$ and about 25 h$^{-1}$.

* * * * *